No. 861,600. PATENTED JULY 30, 1907.
H. McCANN.
MEANS FOR ATTACHING ARTICLES TO CONCRETE WALLS.
APPLICATION FILED JULY 26, 1905.
5 SHEETS—SHEET 1.
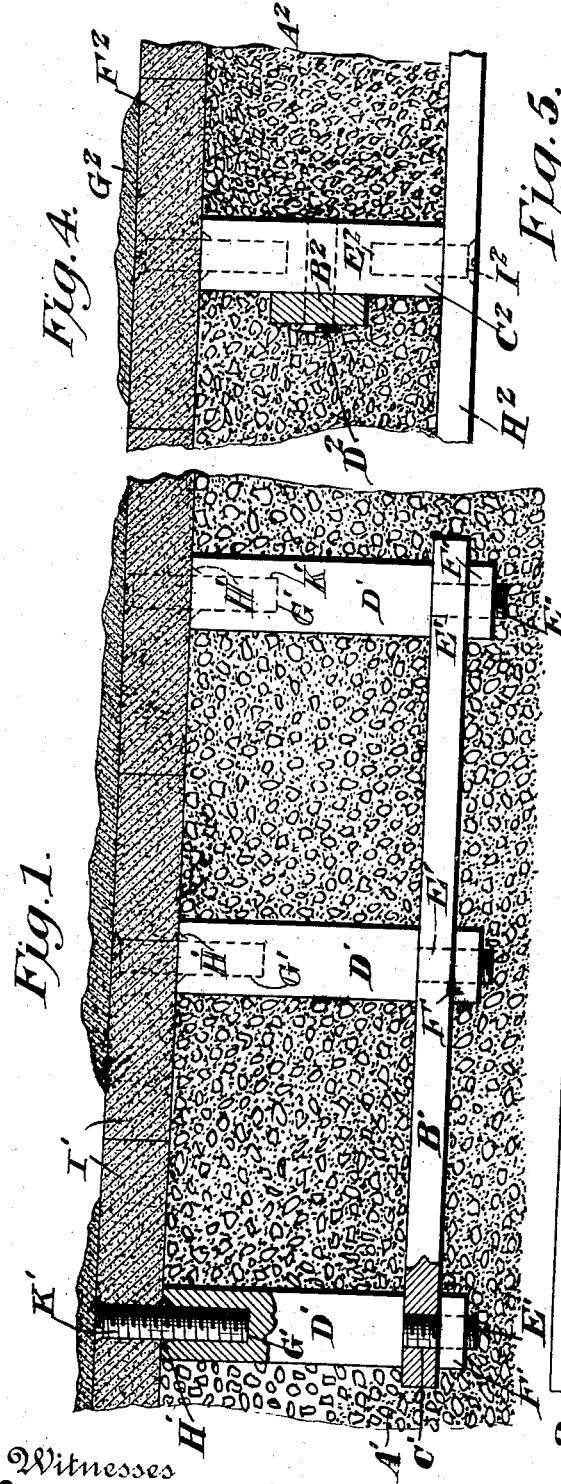
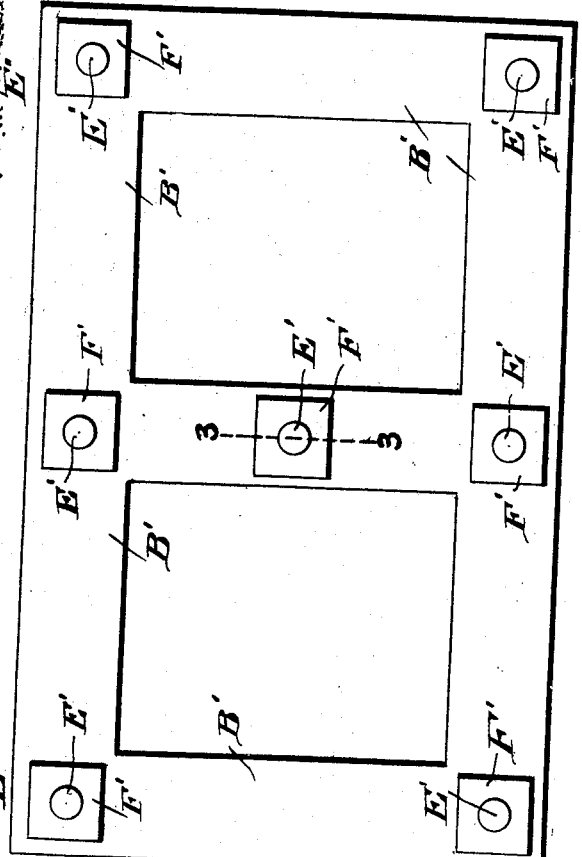
Harry McCann, Inventor No. 861,600. PATENTED JULY 30, 1907.
H. McCANN.
MEANS FOR ATTACHING ARTICLES TO CONCRETE WALLS.
APPLICATION FILED JULY 26, 1905.

5 SHEETS—SHEET 2.

Harry McCann, Inventor

Witnesses
Jas. F. McCathran
B. G. Foster

By C. G. Giggers
Attorney

No. 861,600. PATENTED JULY 30, 1907.
H. McCANN.
MEANS FOR ATTACHING ARTICLES TO CONCRETE WALLS.
APPLICATION FILED JULY 26, 1905.
5 SHEETS—SHEET 3.
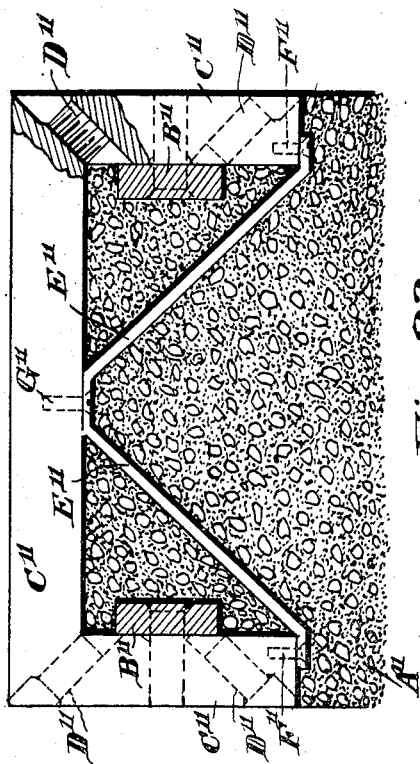
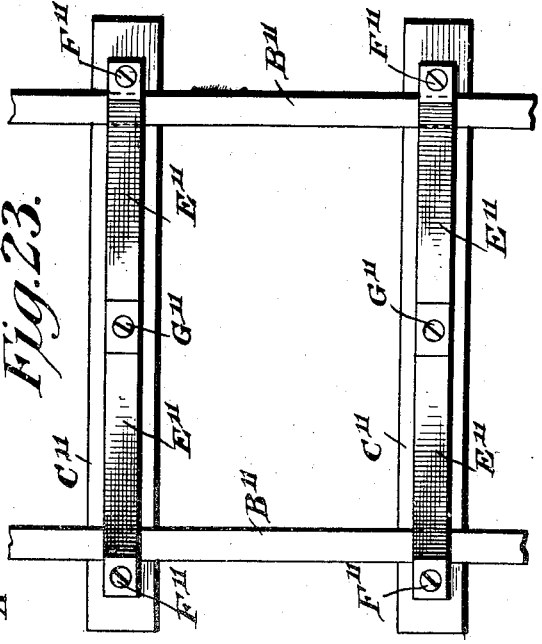
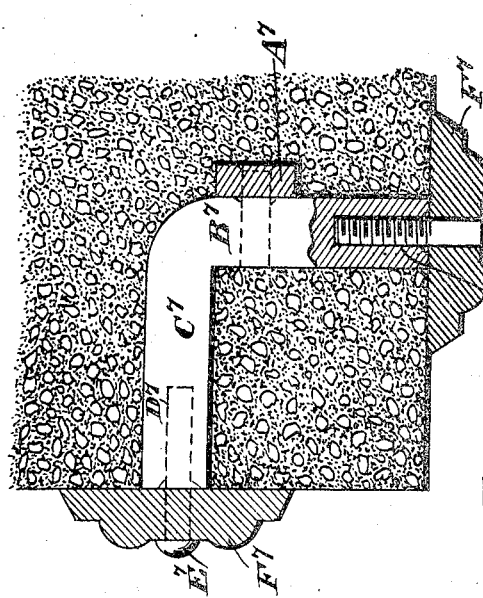
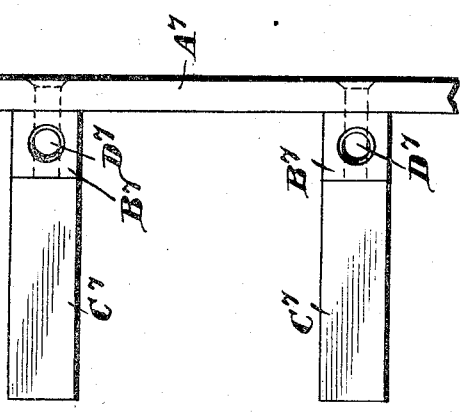
Witnesses
Jas. K. McCathran
B. G. Foster
Harry McCann, Inventor
By E. G. Siggers
Attorney

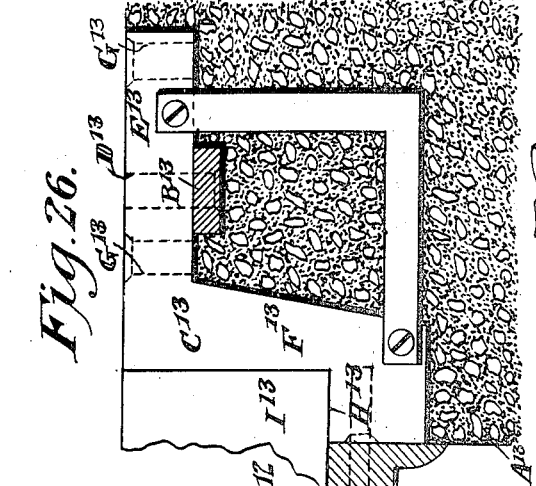
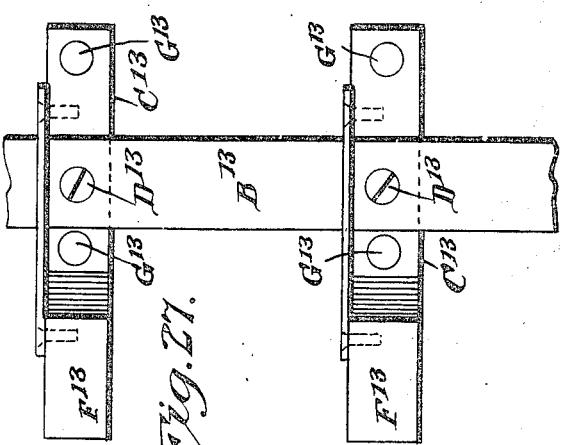
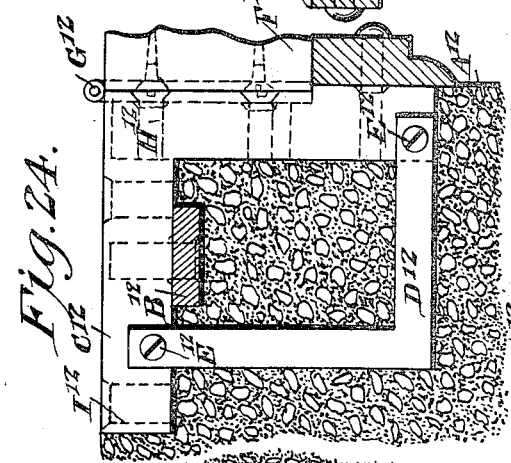
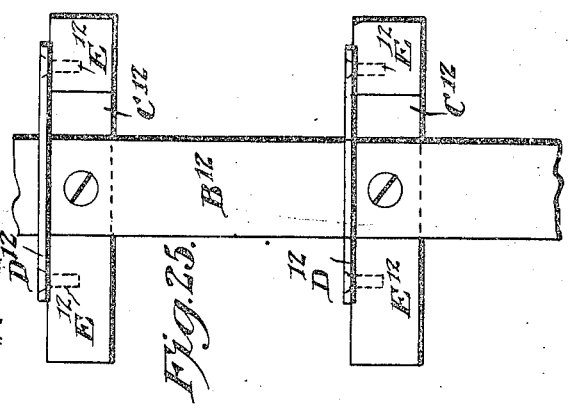
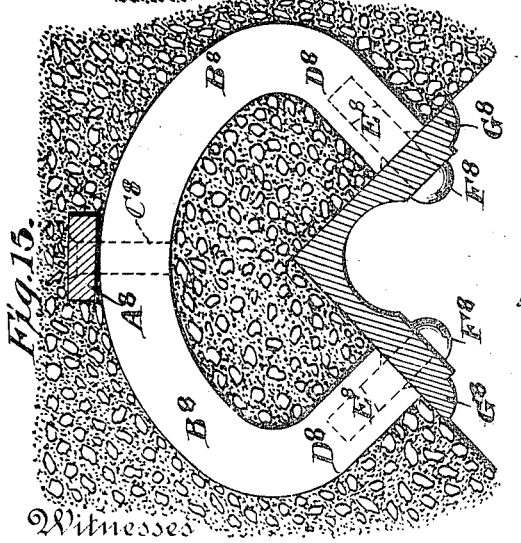
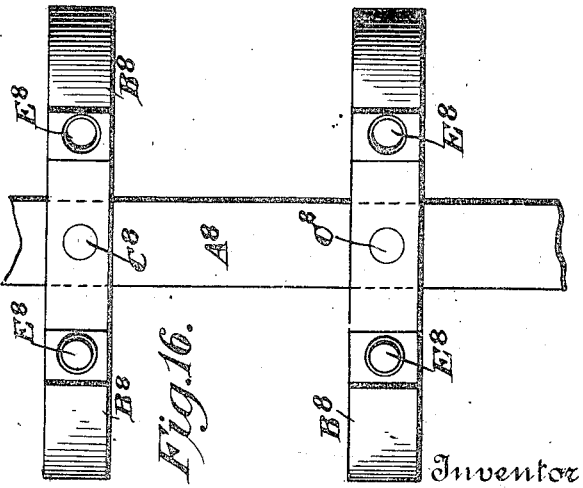

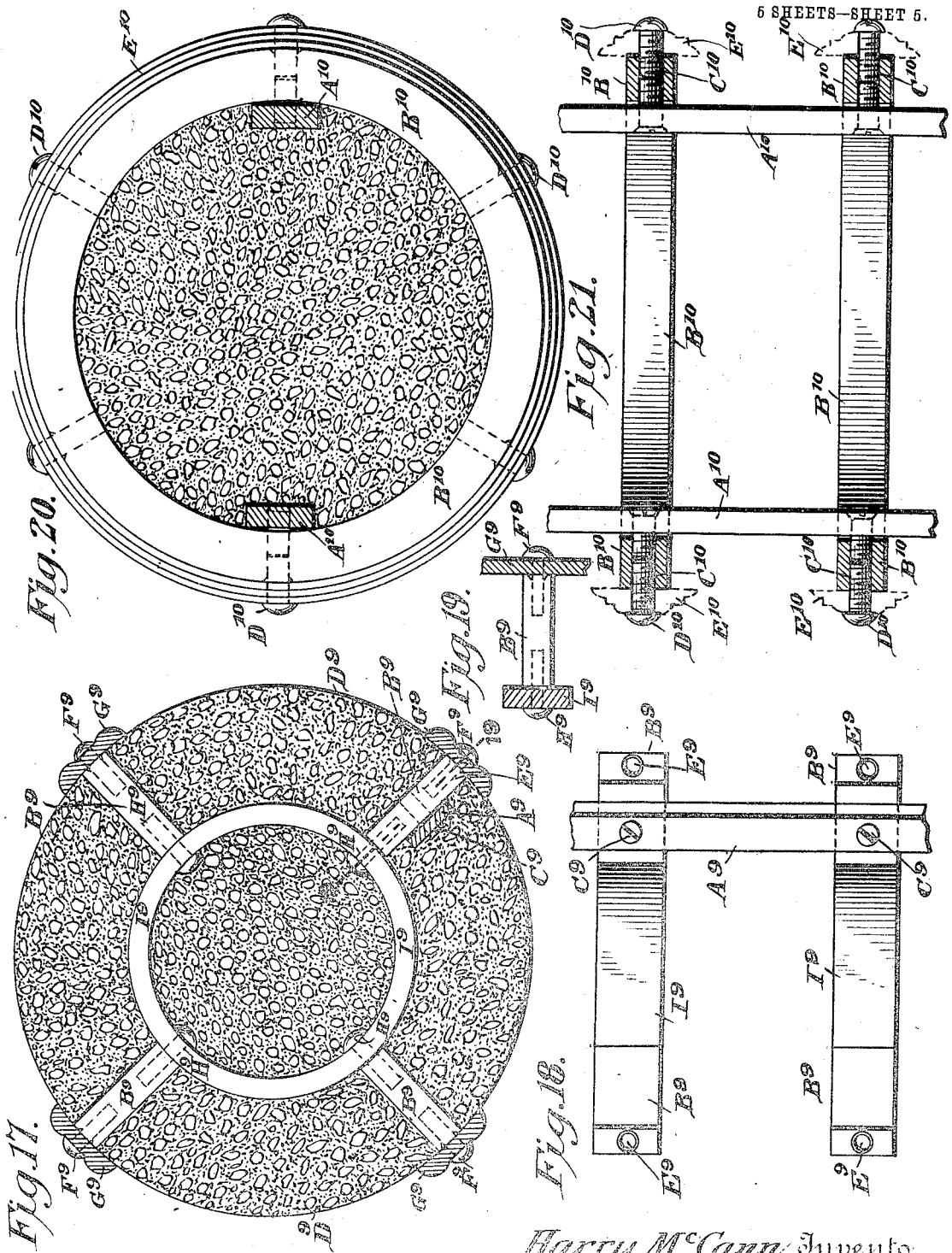

UNITED STATES PATENT OFFICE.

HARRY McCANN, OF HAMILTON, ONTARIO, CANADA.

MEANS FOR ATTACHING ARTICLES TO CONCRETE WALLS.

No. 861,600.  Specification of Letters Patent.  Patented July 30, 1907.

Application filed July 26, 1905. Serial No. 271,363.

*To all whom it may concern:*

Be it known that I, HARRY McCANN, a subject of the King of Great Britain, residing at Hamilton, in the Province of Ontario and Dominion of Canada, have invented a new and useful Means for Attaching Articles to Concrete Walls, of which the following is a specification.

The present invention relates to means for securing fittings, trimmings, and finishings of various kinds to concrete walls.

The principal object is to provide novel means of the above character that are exceedingly simple in structure, may be readily embedded in concrete and similar composite walls during the construction thereof, said means constituting devices whereby trimmings and fittings of various kinds can be readily fastened upon such walls and efficiently maintained in position.

Another object is to provide means whereby door, window, and like frames may be dispensed with, and the doors, windows and other structures can be mounted and hung directly to the concrete wall.

Various forms and embodiments of the invention are illustrated in the accompanying drawings. An inspection of the claims will, however, indicate that the invention is not limited solely to the various structures disclosed, but is open to other changes and modifications.

Figure 10:
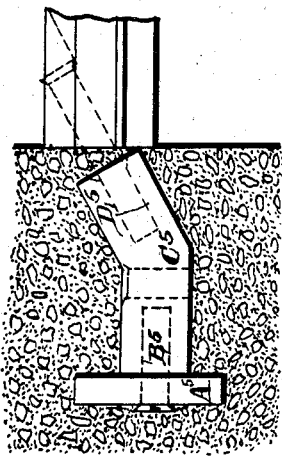
Figure 12:
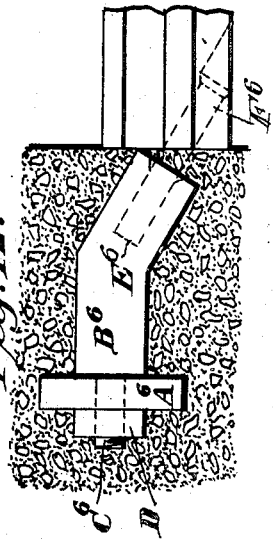
Figure 11:
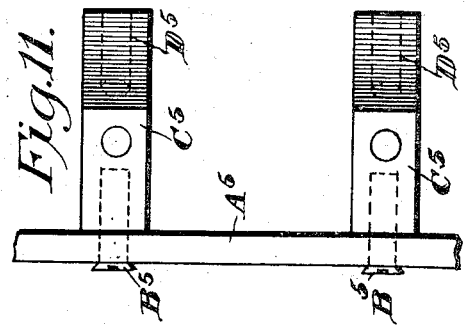
Figure 8:
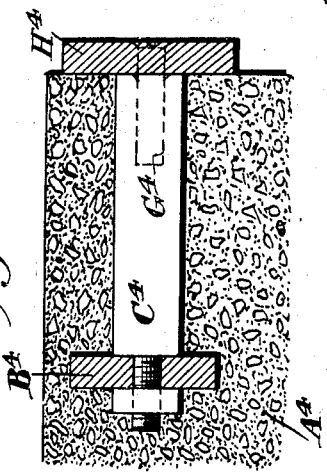
Figure 9:
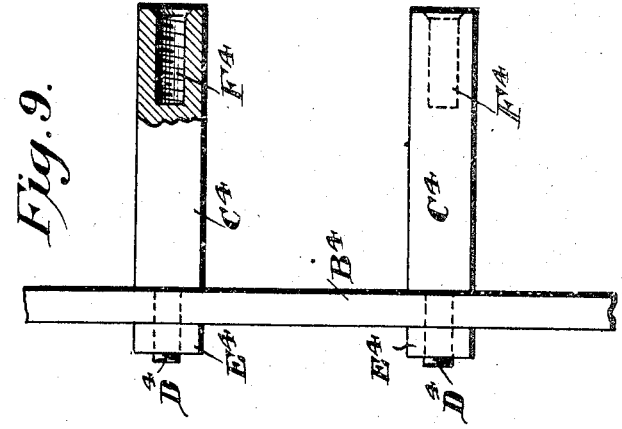
Figure 6:
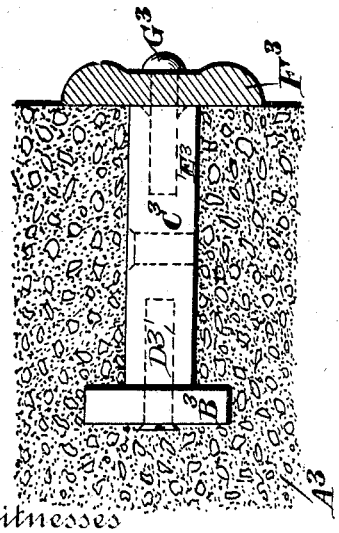
Figure 7:
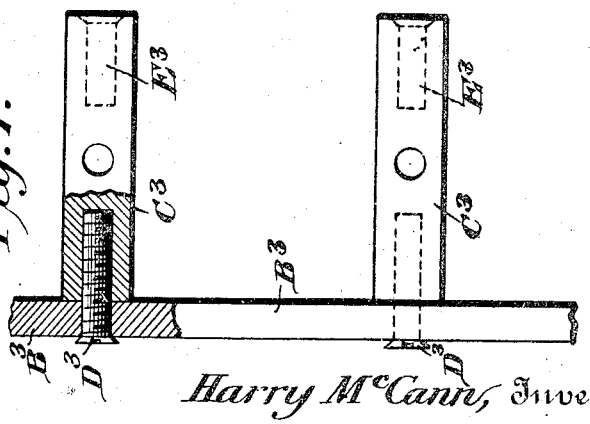

In the drawings: Figure 1 is a sectional view through a portion of a sectional wall, showing means for fastening an ornamental exterior facing to such wall. Fig. 2 is a view in elevation of the means. Fig. 3 is a detail sectional view on the line 3—3 of Fig. 2. Fig. 4 is a detail sectional view through a concrete wall, showing means for securing exterior embellishments and interior fittings to a concrete wall. Fig. 5 is a view in elevation of a portion of the same. Fig. 6 is a detail sectional view through a portion of a concrete wall, showing one embodiment of means for fastening a molding thereto. Fig. 7 is a view partly in elevation and partly in section of a portion of said means. Fig. 8 is a slight modification of the structure illustrated in Fig. 6. Fig. 9 is a view partly in elevation and partly in section of said modification. Fig. 10 is a sectional view through a portion of a concrete wall, showing another embodiment of the holding means for angularly disposed or inclined fasteners. Fig. 11 is a view in elevation of a portion of the same detached from said wall. Fig. 12 is a modification of the structure shown in Fig. 10. Fig. 13 is a detail sectional view through a portion of a concrete wall, showing an angular anchor frame for securing molds to angularly disposed faces of the wall. Fig. 14 is a view in elevation of a portion of said anchor frame. Fig. 15 is a horizontal sectional view through means for securing molding in corners and angles, said means being illustrated embedded in the wall. Fig. 16 is a view in elevation of a portion of said means. Fig. 17 is a cross sectional view through a cylindrical column or pier, showing the fastening means for holding longitudinal moldings thereupon. Fig. 18 is a view in elevation of a portion of the same. Fig. 19 is a detail sectional view on the line 19—19 of Fig. 17. Fig. 20 is a view similar to Fig. 17 but showing means for securing annular embellishments to a column. Fig. 21 is a vertical sectional view through the means illustrated in Fig. 20. Fig. 22 is a sectional view through a portion of an angular pillar or abutment, illustrating means for fastening trimmings thereto. Fig. 23 is a view in elevation of a portion of the same. Fig. 24 is a detail sectional view through a portion of a concrete door jamb showing the means for fastening door hinges thereto. Fig. 25 is a view partially in elevation of the same. Fig. 26 is a view similar to Fig. 24, but of the opposite coöperating jamb with means for holding a door stop in position. Fig. 27 is a view in elevation of a portion of said means.

Similar reference letters designate corresponding parts in all the figures of the drawings.

Referring first to Fig. 1, the concrete wall is designated by the reference letter A′, and in said concrete wall is embedded an anchor frame consisting of angularly disposed anchor strips B′, having openings C′ therethrough. Secured to these anchor strips are fastener-receiving members D′, in the form of studs, disposed transversely of the strips and having threaded stems E′, passing through the openings C′, and held in place by nuts F′. The outer ends of the studs or members D′ are located flush with the outer face of the wall A′, as shown in Fig. 1, and said outer ends are provided with longitudinally disposed threaded fastener-receiving sockets G′, the outer ends of which are countersunk, as shown at H′. An ornamental facing for the walls is shown at I′, and may be of any suitable or desirable construction, said facing consisting of slabs, which are secured to the concrete wall A′ by screws or bolts K′, threaded into the sockets G′. While the frame B′, in the present embodiment, is shown as comparatively small, it will be apparent that as many may be employed as desired, and, moreover, these frames can be made as large as is found convenient for use. They are embedded in the concrete walls during the erection thereof, the sockets G′ being closed by screws. After the wall is completed the ornamental facing is applied and secured in position by the fasteners K′.

In Figs. 4 and 5, a modified structure is illustrated. The concrete wall is shown at A², and embedded therein is an anchor member in the form of a strip B² having secured to one side a plurality of spaced transversely disposed members C², which may be fastened to the strip by screws D² or by any other suitable means. The opposite ends of the members C² are provided with fastener-receiving sockets $E^2$, and said ends are arranged with the faces flush with the outer and inner faces of the concrete wall, as illustrated in Fig. 4. A portion of the wall facing is shown at $F^2$ and is secured in place by a fastener $G^2$, threaded into the outer socket, while on the inside of the wall furring strips $H^2$ can be secured thereto by fasteners $I^2$, passing through the said strips and threaded into the sockets $E^2$.

One means of securing moldings to a concrete wall is illustrated in Figs. 6 and 7, a portion of said wall being shown in Fig. 6 and designated $A^3$. An anchor member in the form of a strip $B^3$ is embedded in the wall and has secured thereto upstanding transversely disposed members in the form of studs $C^3$, fastened to the anchor member by means of screws $D^3$, threaded into the inner ends of the studs, which ends are abutted against the strip. The outer ends of the studs $C^3$ have fastener-receiving sockets $E^3$, and a molding, as, for instance, $F^3$, fitted against the wall, is held in position by fastening screws $G^3$, passed through said molding and threaded into the sockets $E^3$. A slight modification of this structure is illustrated in Figs. 8 and 9. In Fig. 8 a portion of a concrete wall is shown at $A^4$, and in the same is embedded an anchor member in the form of a strip $B^4$, carrying outstanding transversely disposed members $C^4$, which, in this case, have studs $D^4$ passing through the anchor strip, with nuts $E^4$ threaded through the projecting ends and holding the studs in position. The outer ends of the studs have threaded sockets $F^4$, to receive the fasteners $G^4$ for a molding or strip $H^4$.

In case the fasteners are located at an inclination to the face of the concrete wall, the devices illustrated in Figs. 10, 11 and 12 may be employed. In Figs. 10 and 11, the anchor strip is shown at $A^5$, which strip has secured thereto by screws $B^5$ transversely disposed outstanding stud members $C^5$, the outer ends of which are set at an angle to the inner ends and are provided with the usual fastener-receiving sockets $D^5$. In Fig. 12 a slightly different form of this structure is illustrated, the anchor strip being shown at $A^6$ with a stud member $B^6$ having a shank $C^6$ passing through the anchor strip and held in position by a nut $D^6$, threaded upon said shank. The outer portion of the stud $B^6$ is set at an inclination to the inner portion and has a socket $E^6$ to receive the fastener $F^6$.

Where moldings are to be secured to the angularly disposed sides of projecting corners and the like, the structure illustrated in Figs. 13 and 14 may be employed. In this embodiment of the invention, an anchor strip is shown at $A^7$, which strip is provided with spaced transverse angular members $B^7$, extending on opposite sides of said strip, the arms $C^7$ of said members, respectively extending to the angularly disposed faces of the wall and terminating at the same, said arms being provided with sockets $D^7$, that receive fastener screws $E^7$, holding moldings, as $F^7$, in position upon the wall. For the reverse of this arrangement, attention is invited to Figs. 15 and 16, showing means for fastening moldings and other embellishments in the corners formed by angularly disposed walls. The anchor strip in this case is shown at $A^8$, and secured thereto are curved horseshoe members $B^8$, extending on opposite sides of the same and fastened thereto by screws $C^8$. The terminal portions $D^8$ of the members are convergently disposed and have their outer ends flush with the wall faces, said ends being provided with sockets $E^8$, receiving fastener screws $F^8$, to hold the molding or ornamentation $G^8$ in place.

For the purpose of securing longitudinal strips or moldings to cylindrical or other columns, the structure shown in Figs. 17, 18 and 19 is employed, said structure consisting of one or more anchor strips $A^9$ having stud members $B^9$ fastened thereto by means of screws or other suitable devices $C^9$. The outer ends of said members $B^9$ are flush with the faces of the pillar $D^9$, but have sockets $E^9$ to receive fasteners $F^9$ that hold the strips or moldings $G^9$ in place upon the pillar. These stud members $B^9$ are, furthermore, preferably secured at their inner ends by means of screws $H^9$ to rings $I^9$, embedded in the concrete body of the pillar.

If annular bands are to be placed upon a cylindrical pillar, the structure illustrated in Figs. 20 and 21 can be advantageously employed. In this form of the invention, anchor strips $A^{10}$ have secured thereto spaced annular rings $B^{10}$, which are arranged to have their outer faces flush with the surface of the pillar. These rings $B^{10}$ have threaded sockets $C^{10}$, receiving fasteners $D^{10}$, whereby annular bands $E^{10}$ are held in position.

In Figs. 22 and 23 there is illustrated a structure particularly adapted for angular pillars, abutments and the like, wherein the concrete wall $A^{11}$ has three exposed faces. A plurality of anchor strips $B^{11}$ are employed to which are secured three-sided transversely disposed members $C^{11}$, the outer faces of the members being arranged flush with the three faces of the wall, as shown in Fig. 22, certain of the same having suitable angularly disposed fastener-receiving sockets $D^{11}$. The free terminals of the members are preferably maintained in position by braces $E^{11}$, the ends of which are secured to the ends of the members by suitable fasteners $F^{11}$, the braces for each member preferably consisting of a single strip having its central portion fastened to the central portion of the member as shown at $G^{11}$.

If doors are to be hung, the structure disclosed in Figs. 24 to 27 is employed. For the hinged side of the door, the device disclosed in Figs. 24 and 25 is provided. The door jamb is shown in section at $A^{12}$ and consists of concrete. In the same is embedded an anchor frame including a strip $B^{12}$ having secured thereto transversely disposed angular members $C^{12}$, which members are reinforced by angular braces $D^{12}$, the terminals of said braces being fastened to the terminal portions of the members by screws $E^{12}$, the device thus completely surrounding the anchor strip $B^{12}$. A portion of the door is shown at $F^{12}$, the same having secured thereto one leaf of a hinge $G^{12}$, the other leaf being fastened to the adjacent arms of certain of the members $C^{12}$, as shown at $H^{12}$. The other arms of said members may be provided with other fastener-receiving sockets $I^{12}$, whereby the trimmings for the door frame can be secured in place. The structure illustrated in Figs. 26 and 27 is devised for the free side of the door, the concrete jamb being shown at $A^{13}$ and having embedded therein an anchor strip $B^{13}$ to which are secured angular members $C^{13}$ by means of screws $D^{13}$. Each of these members comprises arms $E^{13}$ and $F^{13}$, one of which as indicated at $G^{13}$ has fastener-receiving sockets whereby the trimmings for the jamb can be secured in place. The other arm $F^{13}$ constitutes a stop, being provided with an inset shoulder H¹³ against which the door I¹³ abuts.

From the foregoing it is thought that the construction, operation, and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus described my invention what I claim as new and desire to secure by Letters Patent, is:

1. The combination with a concrete wall, of means for securing articles to the same, said means comprising an anchor member embedded in the wall and having a plurality of spaced openings therethrough, a plurality of relatively fixed members having a plurality of fastener-receiving sockets opening through the face of the wall, and means for fastening the members rigidly to the anchor member, said means passing through the openings in said member.

2. The combination with a concrete wall having angularly disposed faces, of means for securing articles to the angularly disposed faces of the same, said means comprising an anchor frame embedded in the wall, said frame including a plurality of rigidly connected fastener-receiving devices disposed in angular relation and exposed in the angularly disposed faces of the wall.

3. The combination with a concrete wall having angularly disposed faces, of means for securing articles to the angularly disposed faces of the concrete wall, said means comprising an anchor frame composed of angularly disposed relatively fixed and rigidly connected fastener-receiving devices embedded in said concrete wall with their outer sides flush with the angularly disposed faces thereof.

4. The combination with a concrete wall, of means for securing articles to such wall, said means comprising an anchor member having a plurality of spaced openings embedded in the wall, and outstanding transversely disposed elements associated with the anchor member and provided with fastener-receiving sockets opening through the face of the wall, said elements having reduced threaded stems passing through the openings in the anchor member and rigidly securing them to said member.

5. The combination with a concrete wall, of means for securing articles to the face of said concrete wall, said means including an anchor strip embedded in the wall, and spaced transversely disposed elements extending across the anchor strip and having their rear sides secured between the ends to the strip, said elements being each provided in its outer face with a plurality of fastener-receiving sockets opening through the face of the wall.

6. The combination with a concrete wall having a plurality of faces, of means for securing articles to said concrete wall, said means including an anchor strip embedded in the wall, and a transversely disposed member carried by the anchor strip and also embedded in the wall, said member being provided on opposite sides of said strip with fastener-receiving sockets opening through different faces of the wall.

7. The combination with a concrete wall having angularly disposed faces, of means for securing articles to the face of the concrete wall, said means including an anchor strip embedded in the wall, and a transversely disposed angular fastener-receiving member carried by the strip and fixed against movement thereon, said member having its angularly disposed portions arranged substantially parallel to the angularly disposed faces of the wall.

8. The combination with a concrete wall having a plurality of different faces, of means for securing articles to different faces of said concrete wall, said means including an anchor member embedded in the wall, and an angular member carried by the anchor member and rigidly fixed against movement thereon, said member being also embedded in the wall and provided with a plurality of fastener-receiving sockets opening through different faces of the wall.

9. The combination with a concrete wall, of means for securing articles to the face of the concrete wall, said means including an anchor strip embedded in the wall, and a plurality of spaced members fixed against movement to the strip and embedded in the wall, said members being disposed transversely of the anchor strip and each having a plurality of fastener-receiving sockets opening through the face of the wall.

10. The combination with a concrete wall, of means for securing articles to said wall, said means comprising an anchor strip embedded in the wall, and a plurality of spaced transversely disposed members each having means that rigidly secure it against movement to the strip, said members being embedded in the wall, each of said members having their outer sides flush with the wall and said outer sides each having a plurality of threaded fastener-receiving sockets.

In testimony, that I claim the foregoing as my own, I have hereto affixed my signature in the presence of two witnesses.

HARRY McCANN.

Witnesses:
GORDON S. WRIGHT,
LINDLEY HARPER.